(12) United States Patent
Oliva

(10) Patent No.: US 6,642,909 B1
(45) Date of Patent: Nov. 4, 2003

(54) PERSONAL ELECTRONIC BOOK PROVIDING KEYPAD AND READABLE AND WRITABLE CD DRIVES

(76) Inventor: Anthony R. Oliva, 10505 69th Ave., Apt. 616, Forest Hills, NY (US) 11375

( * ) Notice: Subject to any disclaimer, the term of this patent is extended or adjusted under 35 U.S.C. 154(b) by 253 days.

(21) Appl. No.: 09/633,605

(22) Filed: Aug. 7, 2000

(65) Prior Publication Data

(65)

(51) Int. Cl.[7] .................................................. G09G 5/00
(52) U.S. Cl. ......................... 345/1.3; 345/1.1; 345/901; 345/903; 345/905
(58) Field of Search ............................... 345/1–3, 901, 345/903, 905; D14/315

(56) References Cited

U.S. PATENT DOCUMENTS

| | | | |
|---|---|---|---|
| 4,159,417 A | * | 6/1979 | Rubincam .................... 235/375 |
| 4,820,167 A | * | 4/1989 | Nobles et al. ........... 434/307 R |
| 5,239,665 A | * | 8/1993 | Tsuchiya ..................... 345/776 |
| 5,475,398 A | | 12/1995 | Yamazaki et al. |
| 5,534,888 A | | 7/1996 | Lebby et al. |
| 5,663,748 A | | 9/1997 | Huffman et al. |
| 5,761,485 A | | 6/1998 | Munyan |
| 5,774,109 A | | 6/1998 | Winksy et al. |
| 5,847,698 A | * | 12/1998 | Reavey et al. ............... 345/173 |
| 5,914,706 A | * | 6/1999 | Kono .......................... 345/173 |
| 5,937,158 A | | 8/1999 | Uranaka |
| 5,956,048 A | | 9/1999 | Gaston |
| 6,108,716 A | * | 8/2000 | Kimura et al. ............... 345/168 |
| 6,345,283 B1 | * | 2/2002 | Anderson ....................... 707/1 |
| 6,405,278 B1 | * | 6/2002 | Liepe .......................... 711/103 |
| 6,424,338 B1 | * | 7/2002 | Anderson .................... 345/173 |

* cited by examiner

*Primary Examiner*—Richard Hjerpe
*Assistant Examiner*—Duc Q Dinh
(74) *Attorney, Agent, or Firm*—Collard & Roe, P.C.

(57) ABSTRACT

The invention relates to an electronic device for the display and input of text and data. The present invention provides a flat screen, which displays textual information, hinged to a keypad, which provides data entry. The electronic book also has two CD drives. The first of these drives is read only and its purpose is to read CD's that provide several textbooks for display on the screen. The second drive is writable and provides data entry storage. Students may use the keypad and writable CD drive to take notes in class and store them on a CD.

13 Claims, 2 Drawing Sheets

PERSONAL ELECTRONIC BOOK PROVIDING KEYPAD AND READABLE AND WRITABLE CD DRIVES

BACKGROUND OF THE INVENTION

Field of the Invention

The invention relates to an electronic book for the display and input of text and data. Specifically, the present invention provides a flat screen, which displays textual information, hinged to a keypad, which provides data entry. More specifically, the electronic device has two CD drives. The first of these drives is read only and reads CDs to display material from text books on the screen. The second drive is writable and provides data entry and storage. The electronic book is ideal for students who have a CD that contains every text book needed for a given course. These students may use the CD-ROM drive to access their textbook, and the keypad and writable CD drive to take notes in class and store them on a CD.

SUMMARY OF THE INVENTION

The invention relates to an electronic device that is an improvement on an electronic book. The electronic book has a display screen and a fold-up alphanumeric keypad. Adjacent to the display screen are buttons for scrolling up and down the text displayed on the screen. At the top edge of the screen are two drives to house CDs in the book. The purpose of the first CD drive is to read the CD the user has placed in the electronic book. For student use, a CD will have a number of different textbooks that will be used during the course. Once the power is turned on and the screen becomes illuminated, a listing of the books will appear on the screen and the student will scroll to the book needed for review. The student will then activate that book and the text will appear. The student may scroll up or down or jump to particular pages by using the high speed forward or reverse beside the screen.

The second, writable CD drive is provided for data processing purposes. If there is a passage in the text needed for further study, it can be highlighted and transferred to the second CD, namely the writable CD, for storage. The keypad also allows the electronic book to act as a data processor in that the student may type notes to the writable CD. Instead of a full CD drive a 3¼" floppy drive may be used.

When the electronic book is closed the keypad folds up over the display screen and locks in place. When it is opened the keypad may be folded out like a laptop with the screen upright. The keypad may also be fully rotated until it reaches the back of the display screen. It is then held in place by a locking device. A protective flap is also used to cover the keys of the keypad while it is in this position. This protective flap is hinged to the side of the keypad. While the electronic book is in this position it may be held in the student's hands to be read. The keypad is also inoperable in this position.

The electronic book may be powered by a rechargeable battery located within the housing of the unit. The battery contains a converting cord that allows the electronic book to be plugged into an outlet for direct power or battery recharging. The electronic book also includes a power saving feature which allows it to sleep when on but not in use. Additionally, the electronic book may be provided with a television connection that allows the television to act as the screen of the electronic book. This connection allows the unit to conserve power.

BRIEF DESCRIPTION OF THE DRAWINGS

Other objects and features of the present invention will become apparent from the following detailed description considered in connection with the accompanying drawings which disclose several embodiments of the present invention. It should be understood, however, that the drawings are designed for the purpose of illustration only and not as a definition of the limits of the invention.

DETAILED DESCRIPTION OF THE PREFERRED EMBODIMENT

Figure 1:
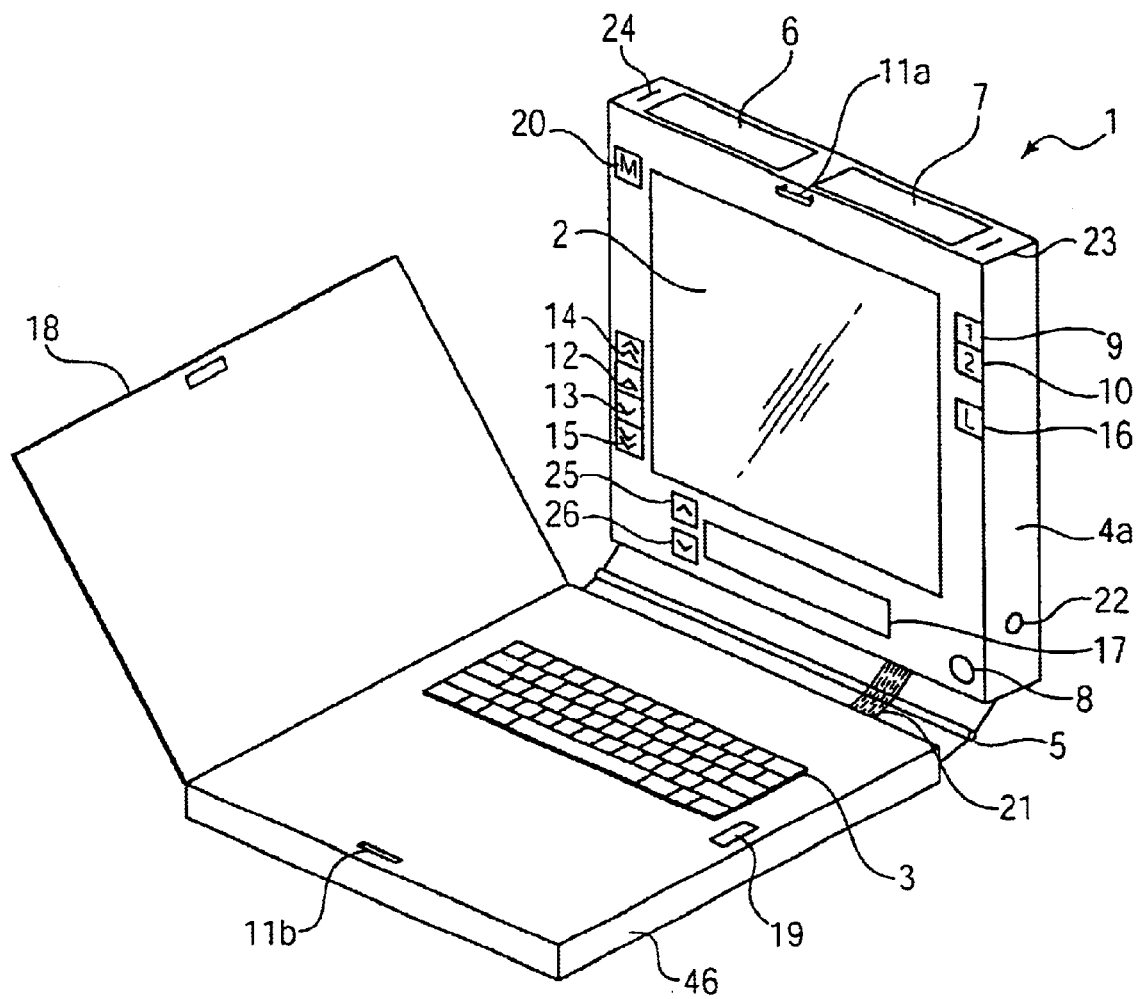
FIG. 1 shows a perspective view of the electronic book in the open position.

FIG. 1 shows electronic book 1 in the open position. Electronic book 1 has a flat display screen 2 that displays the text to be read by the user. Flat display screen 2 is enclosed by a housing 4a. Electronically and mechanically connected below flat display screen 2 is keypad 3 that allows the user to type text into electronic book 1 for display on flat display screen 2. Keypad 3 is also enclosed by a housing 4b. Electronic book 1 may be opened or closed due to a hinge device 5. In a closed position, housing 4b surrounding keypad 3 lies flat on top of housing 4a surrounding flat display screen 2.

For textual information to be displayed on flat display screen 2, a CD must be loaded into CD-ROM drive 6 located behind flat display screen 2. To load a CD, eject button 24 next to CD-ROM drive 6 is pressed and the CD is placed inside the CD-ROM drive and closed. The CD is removed in the same manner. To activate electronic book 1, power button 8 is pressed. Pressing power button 8 activates the electronic processor within housing 4a, which controls and monitors the operation of electronic book 1. To start CD-ROM drive 6, CD button 9 located beside flat display screen 2 is pressed. Once pressed, a text book and chapter from the CD may be chosen by the user. A list of books is displayed on flat display screen 2 and the user selects a book by pressing the arrow keys disposed on keypad 3, which allow the user to scroll through the books. A book is selected by pressing the enter key disposed on keypad 3.

The text book and chapter chosen are displayed on second display screen 17 directly below flat display screen 2. The chapters of the book may be changed on this screen by pressing down button 26 to advance the chapters and up button 25 to return to the previous chapter.

Data may also be fed into electronic book 1 through the use of a solid state memory device or a small computer system interface (SCSI). The SCSI would provide for at least a 10 megabyte/sec transfer rate.

While reading text, the user may scroll down to advance the text on the screen. To scroll down the user presses a first scroll button 12 disposed on the side of flat display screen 2. If the user wishes to return to text that was passed, the user may press a second scroll button 13 that scrolls upward. The user may also advance or return through the material quicker than using scroll buttons 12 or 13. The user may press forward button 15 disposed on the side of flat display screen 2 that allows the user to move through the material by chapters or other large categories in the text. Reverse button 14 also disposed on the side of flat display screen 2 allows the user to navigate backward through chapters.

The text displayed on flat display screen 2, may be enlarged by pressing large print button 16 located beside flat display screen 2. The text may be returned to its normal size by pressing large print button 16 again. The text displayed on flat display screen 2 may be highlighted by the user by pushing memory button 20, located beside flat display screen 2. These segments may remain highlighted or may be copied to the CD in writable CD drive 7 so that it may be recovered at a later time.

When originally selecting a book the scroll buttons may be used to scroll through the list of books on display screen 2, and memory button 20 may be used to select the book.

Writable CD drive 7 is located next to CD-ROM drive 6 and behind flat display screen 2. It may be used by pressing eject button 23 and loading a CD, much like CD-ROM drive 6. To activate writable CD drive 7, a second CD button 10 is pressed by the user. This writable CD drive allows the electronic book 1 to act as a data processor. Text may be entered through the use of keypad 3, and then saved to a CD through writable CD drive 7. Text also may be copied from the material displayed through CD-ROM drive 6 to a CD in writable CD drive 7. This allows a student to read from his textbook while also having the ability to take notes in class.

Writable CD drive 7 may alternatively be a fixed memory device or drive. The information could then be downloaded to another computer.

In order to conserve power, the electronic book may be hooked up to a television through video output 22. The display that ordinarily would be displayed on flat display screen 2 is instead displayed on a television. This also provides for a larger viewing screen.

Figure 2:
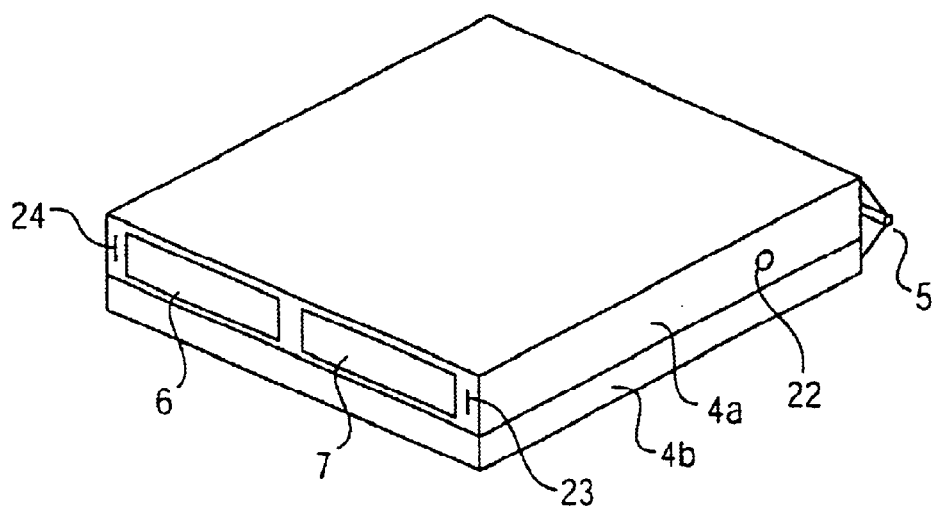
FIG. 2 shows a perspective view of the electronic book in the closed position.

When in the closed position, as shown in FIG. 2, flat display screen 2 lies flat against keypad 3. A locking mechanism locks the electronic book in this position and may be released by the user to be opened. The locking mechanism has a hooked latch 11a disposed on housing 4a and a receiving hole 11b embedded in housing 4b.

When in the closed position, as shown in FIG. 2, flat display screen 2 lies flat against keypad 3. A locking mechanism 11 locks the electronic book in this position and may be released by the user to be opened.

Figure 3:
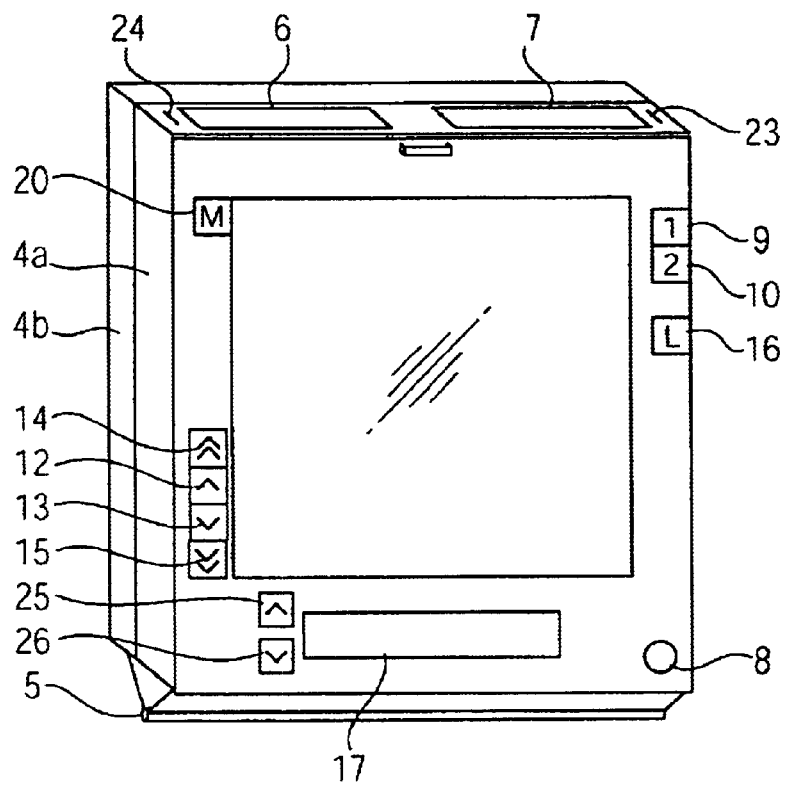
FIG. 3 shows a perspective view of the electronic book in the open position where the keypad has been rotated fully around to the back of the display screen.

FIG. 3 shows electronic book 1 in the open position, with housing 4b for keypad 3 rotated completely around flat display screen 2. The backs of both sections are flush against one another in this position. This rotation is accomplished by hinge 5 being offset from housings 4a and b. Keypad 3 may also be locked in this position. When in this position, the user may hold electronic book 1 as though reading a regular book. All buttons beside flat display screen 2 are still active when in this position. To protect keypad 3 a flap 18 is provided so that no keys are exposed. This flap 18 is held in place by connecting strip 19. Since an offset hinge is used, power is provided to keypad 3 by a flat flexible wire 21.

Figure 4:
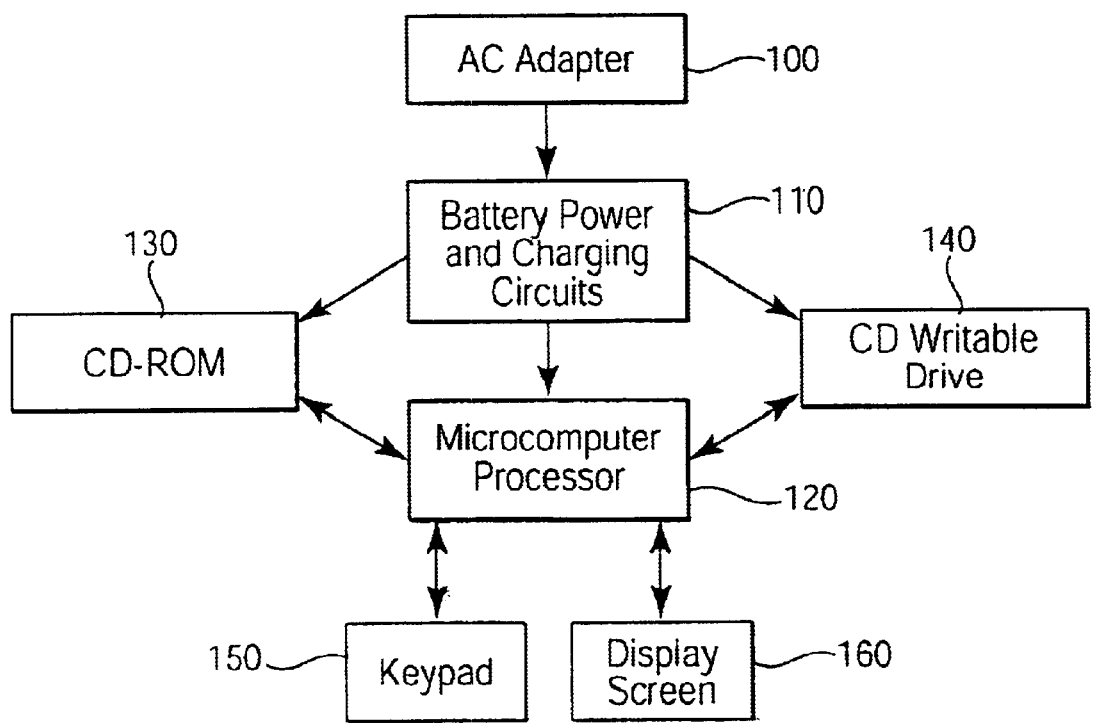
FIG. 4 shows a block diagram of the electronics used in the electronic book.

FIG. 4 shows a block diagram of the electronics used in the electronic book. AC adapter 100 is used to power the electronic book through a wall outlet. Adapter 100 feeds a rechargeable battery 110, which powers processor 120, CD-ROM 130, and writable CD drive 140. Processor 120 further powers keypad 150 and display screen 160.

Accordingly, while only a single embodiment of the present invention has been shown and described, it is obvious that many changes and modifications may be made thereunto without departing from the spirit and scope of the invention.

What is claimed is:

1. An electronic book comprising:
   a) a first housing having a front, a back and sides;
   b) a second housing having a front, a back and sides, wherein a side of said second housing is coupled to a side of said first housing;
   c) a flat display screen disposed in said front of said a first housing;
   d) an alphanumeric keypad disposed in said front of said second housing, wherein said alphanumeric keypad allows a user to enter text so that it may appear on said flat display screen;
   e) a hinge that couples said first housing to said second housing, wherein said hinge is spaced outwardly from said sides of said first housing and second housing, permitting the electronic book to take a closed position, a word processing position or a reading position by revolving around said hinge from a position where said fronts of said first housing and said second housing lie flush against one another to a position where said backs of said first housing and said second housing lie flush against one another;
   f) an electronic processing means disposed in said second housing that controls and monitors the operations of said electronic book in accordance with user requests;
   g) a CD-ROM drive coupled to said electronic processing means, wherein said CD-ROM drive reads CDs for textual display on said flat display screen; and
   h) a writable CD drive coupled to said electronic processing means, wherein said writable CD drive saves data typed to said flat display screen through said alphanumeric keypad, or copied from material read from said CD-ROM drive;
   i) a protective flap, hinged to one of said sides of said second housing other than sad side that said first housing is hinged to, wherein said protective flap covers said alphanumeric keypad when in said closed position or said reading position; and
   j) a second smaller screen on said first housing that displays book and chapter information;
      wherein the electronic book is in a closed position when said fronts of said at least two housings lie flush with one another so that said flat display screen and said alphanumeric keypad are inaccessible;
      wherein said flat display screen and said alphanumeric keypad are simultaneously viewable by a user when the electronic book is in said word processing position;
      wherein said backs of said at least two housings lie flush against one another when the electronic book is in said reading position and making only said flat display screen accessible to said user; and
      wherein said alphanumeric keypad is inactive and protected by said protective flap when the electronic book is in said reading position.

2. The electronic book of claim 1, further comprising a navigational control coupled to said electronic processing means, wherein said navigational control comprises:
   a) a first scroll button providing downward scrolling of material on said flat display screen;
   b) a second scroll button providing upward scrolling of material on said flat display screen.
   c) a forward button that allows a user to quickly move through the material displayed on said flat display screen; and d) a reverse button that allows a user to quickly move backward through the chapters of the material displayed on said flat display screen.

3. The electronic book of claim 1, further comprising a large print button that allows the user to enlarge the text displayed on said flat display screen and return enlarged text to its original size.

4. The electronic book of claim 1, further comprising a memory button that allows the user to highlight words or sentences for later review or writing to a CD.

5. The electronic book of claim 1, further comprising at least one button that allows the user to choose a specific item from said second smaller screen.

6. The electronic book of claim 1, further comprising a first CD button that activates said CD-ROM drive.

7. The electronic book of claim 1, further comprising a second CD button that activates said writable CD drive.

8. The electronic book of claim 1, further comprising a down and up button that provides for forward and backward movement through chapters displayed on said second smaller screen.

9. The electronic book of claim 1, further comprising a power button that activates said flat display screen and said alphanumeric keypad.

10. The electronic book of claim 1, further comprising:
a flat flexible circuit electronically connecting said flat display screen with said alphanumeric keypad;
and a connecting strip holding said protective flap in place when positioned over said alphanumeric keypad.

11. The electronic book of claim 1, further comprising a locking mechanism that locks said alphanumeric keypad on top of said flat display screen when not in use and comprising:
a) at least one hooked latch disposed on said first housing; and
b) at least one receiving hole embedded in said second housing.

12. The electronic book of claim 1, further comprising a power supply that provides power to the electronic book and comprises:
a) a rechargeable battery within said first housing of said electronic book; and
b) an electronic adaptor that connects said electronic book to an outlet to provide power and recharge said rechargeable battery.

13. The electronic book of claim 1, further comprising a video output hookup that provides for television linkup and power conservation.

\* \* \* \* \*